United States Patent
Cornog et al.

(10) Patent No.: US 7,043,058 B2
(45) Date of Patent: *May 9, 2006

(54) CORRECTING MOTION VECTOR MAPS FOR IMAGE PROCESSING

(75) Inventors: Katherine H. Cornog, Newburyport, MA (US); Randy M. Fayan, Medford, MA (US); Garth Dickie, Arlington, MA (US)

(73) Assignee: Avid Technology, Inc., Tewksbury, MA (US)

( * ) Notice: Subject to any disclaimer, the term of this patent is extended or adjusted under 35 U.S.C. 154(b) by 846 days.

This patent is subject to a terminal disclaimer.

(21) Appl. No.: 09/838,868

(22) Filed: Apr. 20, 2001

(65) Prior Publication Data

US 2002/0154695 A1    Oct. 24, 2002

(51) Int. Cl.
*G06K 9/00* (2006.01)

(52) U.S. Cl. .................. 382/107; 382/173; 348/154

(58) Field of Classification Search ............... 382/107, 382/164, 167, 171, 178, 236, 275, 282; 73/488; 348/154–155, 43; 356/27; 707/3; 375/240.12
See application file for complete search history.

(56) References Cited

U.S. PATENT DOCUMENTS

| | | | |
|---|---|---|---|
| 4,924,310 A | 5/1990 | von Brandt | |
| 5,182,633 A | 1/1993 | Antonio et al. | |
| 5,347,312 A * | 9/1994 | Saunders et al. | 348/443 |
| 5,353,119 A | 10/1994 | Dorricott et al. | |
| 5,369,443 A | 11/1994 | Woodham | |
| 5,394,196 A * | 2/1995 | Robert | 348/699 |
| 5,410,358 A | 4/1995 | Shackleton et al. | |
| 5,438,423 A | 8/1995 | Lynch et al. | |
| 5,469,226 A | 11/1995 | David et al. | |
| 5,579,054 A | 11/1996 | Sezan et al. | |
| 5,594,676 A | 1/1997 | Greggain et al. | |
| 5,608,464 A | 3/1997 | Woodham | |
| 5,617,144 A * | 4/1997 | Lee | 375/240.16 |
| 5,642,170 A | 6/1997 | Hackett et al. | |
| 5,654,771 A | 8/1997 | Tekalp et al. | |
| 5,657,402 A | 8/1997 | Bender et al. | |
| 5,668,914 A | 9/1997 | Inuiya et al. | |
| 5,673,207 A | 9/1997 | Nomura | |
| 5,727,080 A | 3/1998 | Cox et al. | |
| 5,748,761 A | 5/1998 | Chang et al. | |
| 5,805,733 A * | 9/1998 | Wang et al. | 382/232 |
| 5,850,229 A | 12/1998 | Edelsbrunner et al. | |
| 5,880,788 A | 3/1999 | Bregler | |
| 5,920,657 A | 7/1999 | Bender et al. | |
| 5,926,209 A * | 7/1999 | Glatt | 348/143 |
| 5,929,919 A | 7/1999 | DeHaan et al. | |

(Continued)

OTHER PUBLICATIONS

Agrawala, Maneesh, et al., "Model-Based Motion Estimation for Synthetic Animations", ACM Multimedia 95 Electronic Proceedings, Nov. 5-9, 1995, pp. 1-25.

(Continued)

*Primary Examiner*—Barry Choobin
(74) *Attorney, Agent, or Firm*—Peter J. Gordon

(57) ABSTRACT

Visible artifacts in images created using image processing based on motion vector maps may be reduced by providing one or more mechanisms for correcting the vector map. In general, the set of motion vectors is changed by selecting one or more portions of the image. The vectors corresponding to the selected one or more portions are modified. Various image processing operations, such as motion compensated interpolation, may be performed using the changed set of motion vectors.

30 Claims, 10 Drawing Sheets

FIRST IMAGE (A)

SECOND IMAGE (B)

COMBINATION MAP

U.S. PATENT DOCUMENTS

| | | | |
|---|---|---|---|
| 5,940,145 A | | 8/1999 | Burl |
| 5,949,484 A | * | 9/1999 | Nakaya et al. ............ 348/384.1 |
| 5,959,672 A | * | 9/1999 | Sasaki .................... 375/240.23 |
| 5,960,081 A | * | 9/1999 | Vynne et al. ................ 713/176 |
| 5,973,733 A | | 10/1999 | Gove |
| 5,982,389 A | | 11/1999 | Guenter et al. |
| 5,982,440 A | | 11/1999 | Aoki |
| 5,991,459 A | | 11/1999 | Fogel |
| 6,005,625 A | | 12/1999 | Yokoyama |
| 6,014,181 A | * | 1/2000 | Sun ............................ 348/699 |
| 6,016,152 A | | 1/2000 | Dickie |
| 6,028,631 A | * | 2/2000 | Nakaya et al. ......... 375/240.01 |
| 6,031,564 A | * | 2/2000 | Ma et al. ....................... 348/43 |
| 6,075,818 A | | 6/2000 | Thomson |
| 6,081,606 A | | 6/2000 | Hansen et al. |
| 6,088,393 A | | 7/2000 | Knee et al. |
| 6,249,613 B1 | * | 6/2001 | Crinon et al. ................ 382/236 |
| 6,335,985 B1 | * | 1/2002 | Sambonsugi et al. ....... 382/190 |
| 6,408,293 B1 | * | 6/2002 | Aggarwal et al. .............. 707/3 |
| 6,529,613 B1 | * | 3/2003 | Astle .......................... 382/103 |
| 6,563,874 B1 | * | 5/2003 | Lu ......................... 375/240.12 |
| 6,570,624 B1 | * | 5/2003 | Cornog et al. .............. 348/446 |
| 6,658,057 B1 | * | 12/2003 | Chen et al. .................. 375/240 |
| 6,665,450 B1 | | 12/2003 | Cornog et al. |
| 6,766,037 B1 | * | 7/2004 | Le et al. ...................... 382/107 |
| 2001/0019631 A1 | * | 9/2001 | Ohsawa et al. ............. 382/242 |
| 2002/0150161 A1 | * | 10/2002 | Baese et al. ........... 375/240.17 |
| 2002/0154792 A1 | | 10/2002 | Cornog et al. |
| 2002/0186889 A1 | * | 12/2002 | De Haan et al. ............ 382/236 |
| 2002/0191841 A1 | * | 12/2002 | Harman ...................... 382/154 |
| 2003/0035592 A1 | * | 2/2003 | Cornog et al. .............. 382/284 |
| 2003/0103569 A1 | * | 6/2003 | Nakaya et al. ......... 375/240.16 |
| 2004/0022419 A1 | * | 2/2004 | Kesaniemi .................. 382/107 |
| 2004/0091170 A1 | | 5/2004 | Cornog et al. |
| 2004/0234143 A1 | * | 11/2004 | Hagai et al. ................. 382/238 |

OTHER PUBLICATIONS

Barron., J.L. et al., "Performance of Optical Flow Techniques", IJCV 12:1, 1994, pp. 1-60.

Beauchemin, S.S., et al., "The Computation of Optical Flow", ACM Computing Surveys, vol. 27, No. 3, Sep., 1995, pp. 433-467.

Bergen, James R., et al., "Hierarchical Model-Based Motion Estimation", Proc. Euro. Conf. on Comp. Vision, Springer-Verlag, 1992, pp. 237-252.

Bergen, J.R., et al., "Hierarchical Motion-Based Frame Rate Conversion", David Sarnoff Research Center, Princeton, NJ, Apr. 1990, pp. 1-15.

Buxton, B.F., et al., "Computation of optic flow from the motion of edge features in image sequences", Image and Vision Computing, vol. 2, No. 2, May 1984, pp. 59-75.

Chen, Shenchange Eric., et al., "View Interpolation for Image Synthesis", Proc. SIGGRAPH 1993, pp. 279-288.

Ezzat, Tony et al., "Visual Speech Synthesis by Morphing Visemes", Massachusetts Institute of Technology, A.I. Memo No. 1658, CBCL Paper No. 173, May 1999, pp. 1-12.

Flomo Data Sheet, Time-warping software, Aug. 2000, 2 pages.

Gomes et al., "Time Warping of Audio Signals", in Proc. Comp.Graph.International (CGI 99), Jul. 1999, pp. 52-57.

Liu, Hongehe, et al., "Accuracy vs. Efficiency Trade-offs in Optical Flow Algorithms", Proc. 4th Eur.Conf.on Comp. Vision, Apr. 1996, vol. II, pp. 174-183.

Louchet, Jean, et al., "Building new tools for Synthetic Image Animation by using Evolutionary Techniques", Artificial Evolution '95, Proc. of the EA95 Workshop in Brest, France, Sep. 1995.

Lucas, Bruce, et al., "An Iterative Image Registration Technique with an Application to Stereo Vision", Proc. 7th Int'l.Jt.Conf. on AI, 1981, pp. 674-679.

Teodosio, Laura, et al., "Salient Video Stills: Content and Context Preserved", Proc. 1st Int'l.Conf. on Multimedia, Aug. 1993, pp. 39-46.

Schodl, Arno, et al., "Video Textures", Proc. SIGGRAPH 2000, 2000, pp. 489-498.

* cited by examiner

CORRECTING MOTION VECTOR MAPS FOR IMAGE PROCESSING

BACKGROUND

There are many ways in which motion may be estimated between two images. This motion may be described by a set of motion parameters that describe motion of luminance of pixels from a first image to a second image. These motion parameters may be defined at a time associated with either or both of the first and second images, or may be defined at a time between the first and second images. Thus, a vector for each pixel describes the motion of the pixel from one image to the next.

This motion estimate may be computed by using a gradient-based method, of which an example is a technique referred to as computing the "optical flow" between the images, or by using a correlation-based method. The "constant brightness constraint," the assumption underlying the computation of optical flow, may be violated because of a change in an object's position relative to light sources, an object's specularity, an overall luminance change, a lack of similarity between the input images, an object entering or leaving a scene, or an object becoming revealed or occluded. If a violation of the constant brightness constraint occurs, the motion vectors from one coherent area of motion may spread into another coherent area of motion.

If erroneous motion information is used to perform various image processing operations, such as morphing, warping, interpolation, motion effects, and motion blurring, visible artifacts are seen in the resulting output images. For example, in some cases, the foreground may appear to stretch or distort, or the background may appear to stretch or distort, or both.

SUMMARY

Visible artifacts in images created using image processing based on motion vector maps may be reduced by providing one or more mechanisms for correcting the vector map. In general, the set of motion vectors is changed by selecting one or more portions of the image. The vectors corresponding to the selected one or more portions are modified. Various image processing operations, such as motion compensated interpolation, may be performed using the changed set of motion vectors. Various mechanisms for obtaining a changed set of motion vectors may be used separately or combination by a user.

In one method, a region in an image may be defined. The region may be segmented into foreground and background regions. A tracker then may be used to track either the foreground region or the background region or both. A single motion vector or a parameterized motion model obtained from the tracker may be assigned to the tracked region.

In another method, a combination map may be defined to control which pixels of the input images are used to contribute to each pixel of an output image based on how a motion vector transforms a pixel from the input image to the output image. The combination map is used with a specified region to which one or more motion vectors are assigned. Such combination maps may be used in combination with the tracker described above.

In another method, a color image is generated using the motion vectors. The color image then may be modified using conventional color modification tools. The modified color image then may be converted back to motion vectors.

In another method, a user-specified transform between the two images may be used to define a set of vectors that correspond in time and resolution to the motion vectors estimated between the two images. The set of vectors may be combined with the estimated motion vectors to produce a set of vectors used for image processing operations.

Accordingly, in one aspect, motion vectors are generated by determining a set of motion vectors that describes motion between the first and second images. The set of motion vectors is changed by selecting one or more regions in the image and modifying the vectors corresponding to the selected one or more regions. Image processing operations may be performed on the images using the changed set of motion vectors.

The set of motion vectors may be changed by identifying a foreground region and a background region in the first and second images. Tracking is performed on at least one of the foreground region and the background region to determine a motion model for the tracked region. The set of motion vectors corresponding to the tracked region is changed according to the motion model for the tracked region.

The motion vectors may be changed by identifying a foreground region and a background region in the first and second images. A combination map is defined to limit how the vector map is applied to transform a pixel from the input image to the output image.

The set of motion vectors may be changed by receiving an indication of a user specified transform between the first and second images. Vectors are computed using the user specified transform and corresponding in time and in resolution with the motion vectors defined by motion estimation. The computed vectors are combined with the set of motion vectors. In one embodiment, the user specified transform may be defined by at least one point in a first image and at least one corresponding point in the second image. A transform for warping the first image to the second image that maintains correspondence between the at least one point in the first image and the at least one point in the second image may be determined. The vectors are computed by determining, for each pixel, a set of transform vectors that describe the spatial transform of the region of the first image to the corresponding region in the second image. The user specified transform also may be defined by at least one line, and/or by at least one region.

The set of motion vectors may be changed by displaying to the user a color image defined by the set of motion vectors. The user is allowed to modify the color image defined by the set of motion vectors. The set of motion vectors is then changed according to the modified color image.

DETAILED DESCRIPTION

There are several techniques that may be used to reduce visible artifacts in images processed using motion estimates. In general, the vector map that estimates the motion between images may be corrected to change the motion vectors that are causing the artifacts. In particular, one or more regions in the image may be selected. The vectors corresponding to the selected one or more regions are modified. Various image processing functions then may be performed using the changed set of motion vectors.

A first example technique involves identifying foreground and background regions, and applying the motion vectors differently depending on how they relate to the foreground and background in the two images. This technique is described below in connection with FIG. 1A to FIG. 2C. A second example technique involves displaying the vector map as a color image, which can be modified using conventional color manipulation tools or by applying morphological operations to the color image. The modified color image is converted back into a vector map. This technique is described below in connection with FIGS. 3–4. A third example technique involves using image warping technology to generate vectors of user defined motion to replace derived motion vectors. Alternatively, image warping may be used to preprocess images before motion vectors are derived. This technique is described below in connection with FIGS. 5–8.

Figure 1A:
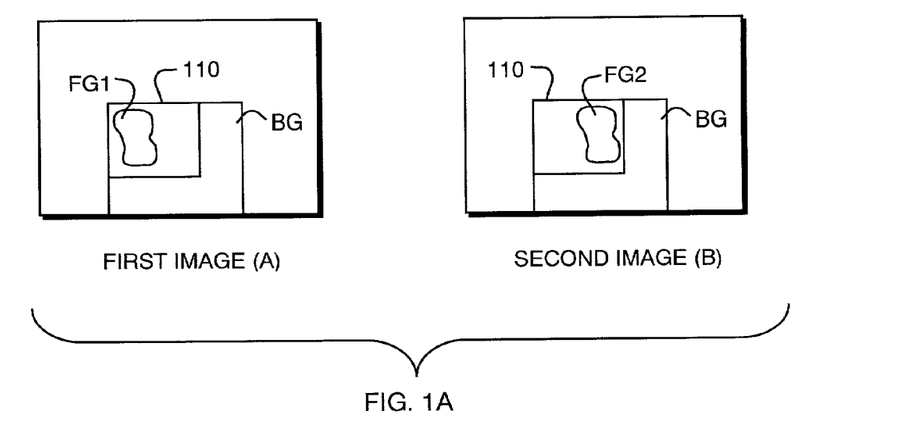
FIGS. 1A–B illustrate segmentation of an image region for modifying the set of motion vectors and creating a combination map.

Referring now to FIG. 1A, a region of an image that contains an artifact is segmented. The image region is segmented into two coherently moving areas: a foreground region (FG1 and FG2) and a background region (BG). This segmentation is performed on each input image of each pair of input images for which the output image exhibits a visible artifact. Identification of a region and this segmentation may be performed automatically, for example using a luma key or a chroma key, or may use a predetermined matte, or may be performed by a user through an appropriate graphical user interface, such as a tracing tool that is used by the user to trace a foreground object. A new set of motion vectors is generated using the defined segmentation. A "combination map" also may be generated, as described below in connection with FIG. 1B in one embodiment, to control how the input images are combined using the new set of motion vectors.

The following are three approaches for fixing the set of motion vectors using the segmented regions of the image. The particular approach used to remove an artifact may be selected by providing a mechanism through a user interface through which the user may indicate the kind of artifact that is present in the image.

Figure 2A:
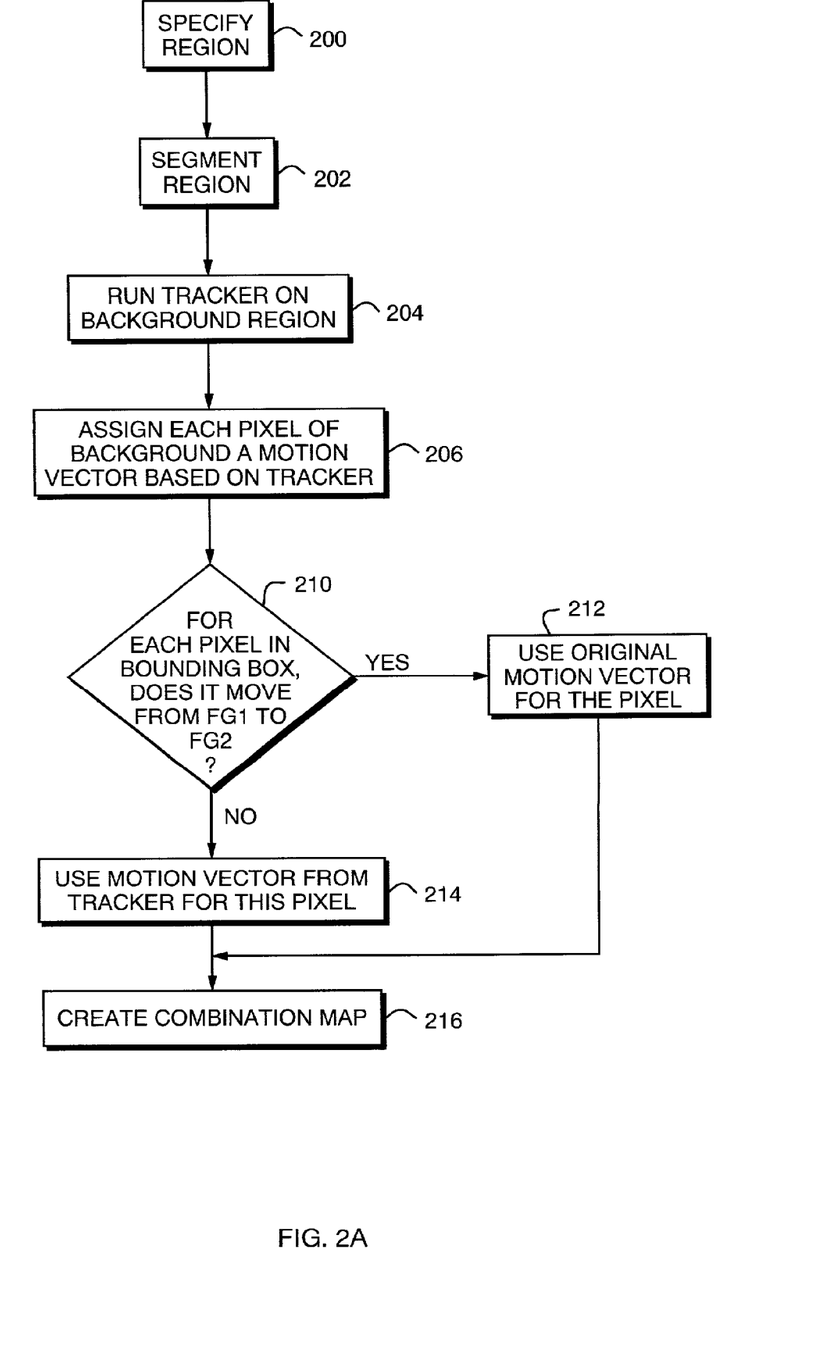
FIG. 2A is a flowchart describing an approach for correcting a first kind of artifact.

The first approach, as shown in the flow chart of FIG. 2A, is used when the background segment shows artifacts, but the foreground segment does not. In this case, the original motion vectors may be used to describe the foreground motion, but not the background motion. After specification of an image region (step 200) and segmentation of the image region (step 202), a motion vector for each pixel in the background area may be determined by running a tracker on the specified background area (step 204). This background area is exclusive of a region (110 in FIG. 1A) that includes both of the foreground regions FG1 and FG2 of the first and second images.

Any suitable tracker, such as those used for stabilization and object tracking applications may be used. The result of the tracker is a parameterized motion model describing the motion of the region that is tracked. The parameterized motion model may be a single motion vector, which describes translational motion, or an affine motion model defined by six parameters, or a projective motion model defined by eight parameters. A motion model is used to generate a new set of per pixel motion vectors.

Each pixel in the entire background region, excluding region 110, is then assigned a motion vector according to the parameterized motion model provided by the tracker (step 206). Next, for each pixel in the bounding box 110, it is then determined whether the original motion vector for the pixel, or the new motion vector for the background is to be used. As shown in FIG. 1A, for each pixel in the bounding box 410 that incorporates foreground FG1 and foreground FG2, if an original motion vector would move the pixel from the foreground region FG1 in the first image to the foreground region FG2 in the second image (step 210) then the original motion vector is used (step 212). Otherwise, the newly determined motion vector for the background is assigned to that pixel (step 214).

Figure 1B:
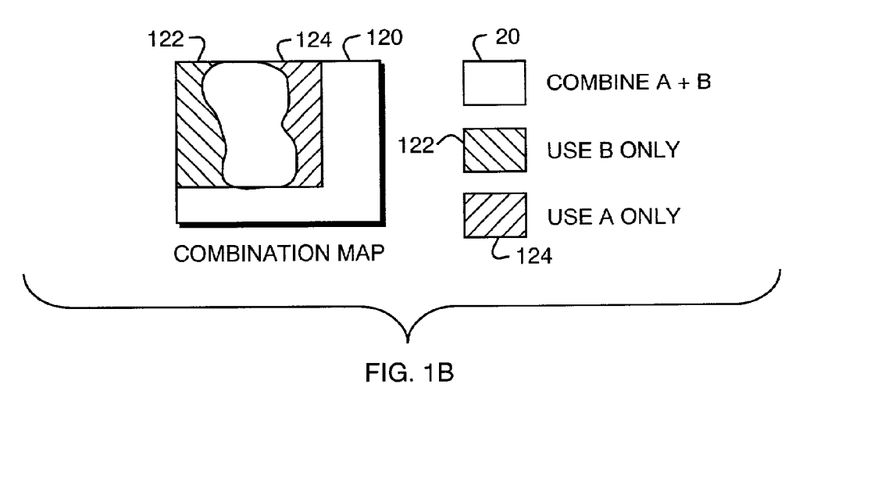

Given the modified set of motion vectors, a "combination map," such as shown in FIG. 1B, may be created (step 216). The combination map may be used to control how pixels from the background and foreground are combined using the new set of motion vectors. In particular, if a pixel in the bounding box 110 (FIG. 1A), and outside of the foreground FG1 of the first input image is transformed by a motion vector to the foreground region FG2 of the second input image, then only the first input image is used to generate the output image using this motion vector. Similarly, if a pixel in the foreground region FG1 (FIG. 1A) of the first input image is transformed by a motion vector to the region outside of the foreground FG2 of the second input image, then only the second input image is used to generate the output image using this motion vector. Thus, each motion vector may be assigned a value, for example by creating a new two-dimensional image, called a "combination map," which has values of 0, 1, or 2. A value of 0 indicates to combine both frames A and B, as indicated at 120. A value of 1 indicates that only frame A contributes to the output when warping, as indicated at 124, and a value of 2 indicates that only frame B contributes to the output, as indicated at 122. The combination map may be processed, for example by a filter, to fill any holes or to account for incorrectly segmented input regions.

Figure 2B:
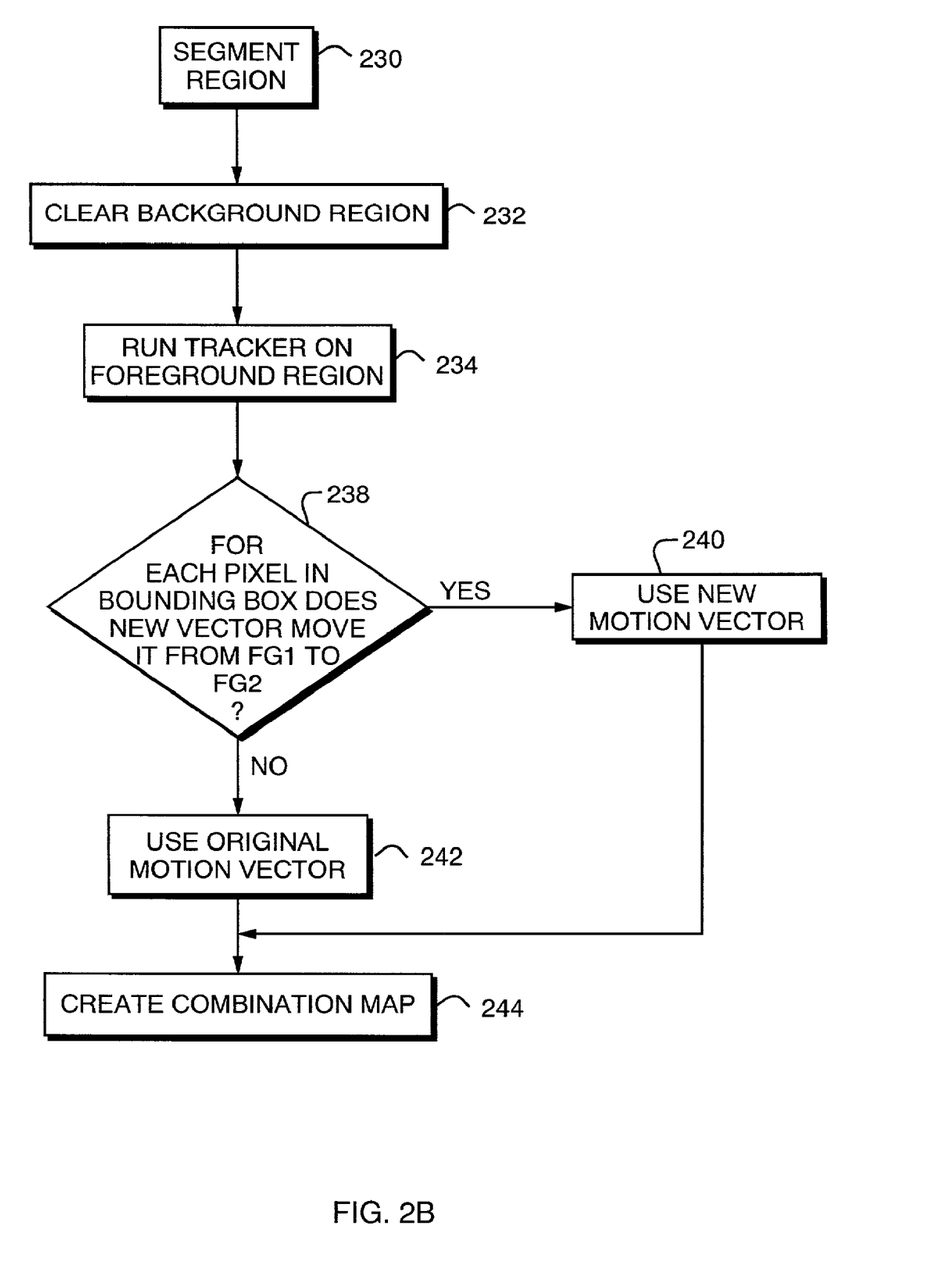
FIG. 2B is a flowchart describing an approach for correcting a second kind of artifact.

In a second approach, shown in FIG. 2B, the foreground segment exhibits artifacts, but the background segment does not. In this case, the original motion vectors may be used to describe the background motion, but not the foreground motion. Thus, after segmenting an area into foreground and background regions (step 230), the background image region is cleared (step 232). A tracker is run on the foreground region (step 234) and to obtain a parameterized motion model. This motion model is used to determine, for each pixel in the region, a motion vector. Next, for each pixel in the bounding box 110, it is determined whether the new motion estimate transforms a pixel in the foreground FG1 of the first image to a pixel in the foreground FG2 of the second image (step 238). If it does, then the new motion vector obtained from the result of the tracker is used (step 240). If not, then the original motion vector is used (step 242). A combination map then may be created (step 244) to decide from which input images pixels are taken in the warping operation.

Figure 2C:
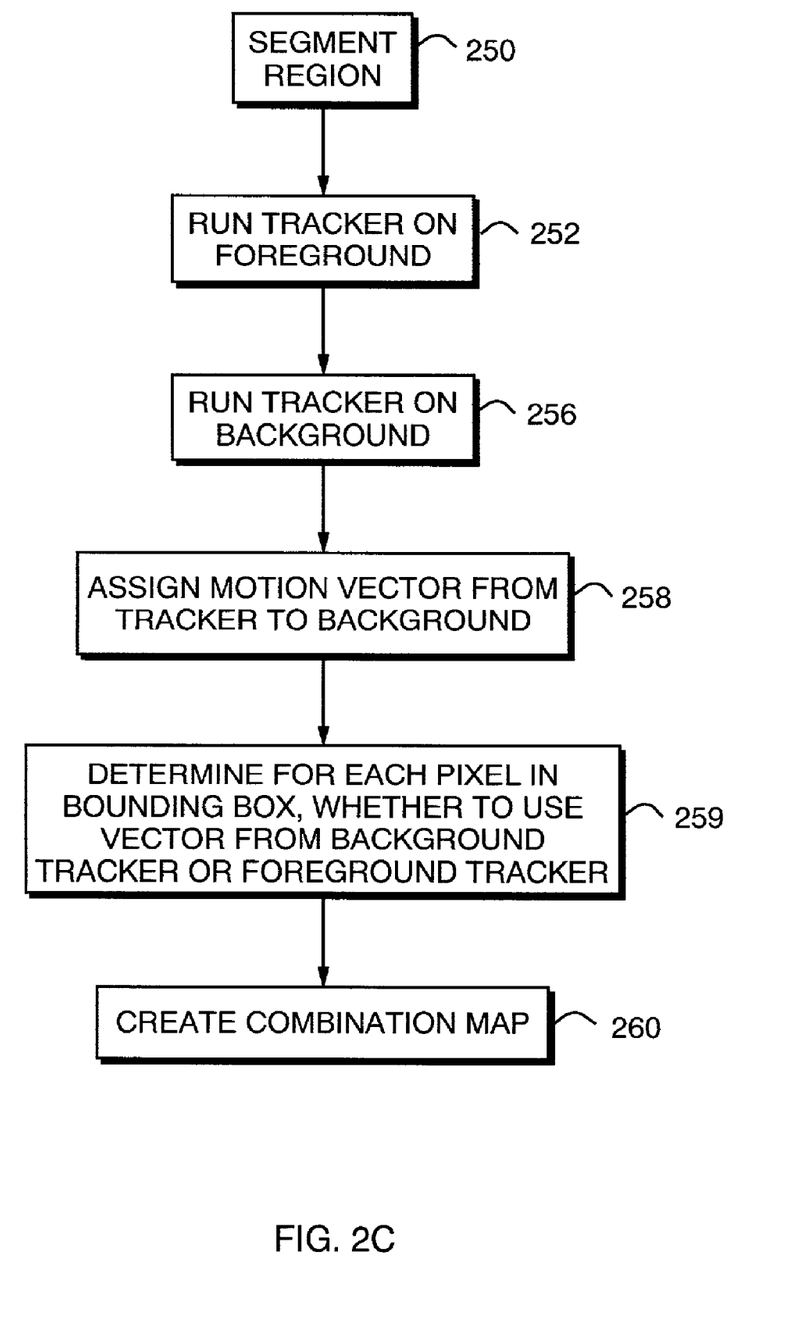
FIG. 2C is a flowchart describing an approach for correcting a third kind of artifact.

In a third approach, as shown in the flow chart of FIG. 2C, both the foreground and background regions exhibit artifacts. After segmentation of the region (step 250), a tracker is run on the foreground region (step 252) to obtain a parameterized motion model. A tracker is run on the background region (step 256) to obtain another parameterized motion model. Each pixel in the background BG and foreground FG is assigned a motion vector according to the results from the tracker (step 258). Pixels in the bounding box 110 are assigned a motion vector from the foreground tracker or from the background tracker according to whether the motion vector from the foreground tracker transforms the pixel from foreground FG1 to foreground FG2 (step 259). A combination map then may be created (step 260).

It should be understood that the combination map as described above may be used with motion vectors assigned through another process to a region, without using a tracker. Given an identified region, the combination map limits how the vector map is applied to the identified region to transform a pixel from the input image to the output image.

Another technique for changing motion vector maps uses a user interface to display a representation of the motion vectors to allow a user to correct one or more individual motion vectors. In particular, the motion vectors may be encoded as a color image that is displayed to the user. The results of changes to the motion vectors may be shown interactively by updating the output image generated by processing the two input images using the updated motion vectors. A number of options may be presented to the user to change the set of motion vectors. For instance, a user may be permitted to define a region of vectors. The user may provide a single value for the whole region, or a separate value for each of several individual pixels in the region. Alternatively, a single value could be assigned automatically to the region, for example by computing an average value of a different region of vectors, or other values may be assigned automatically. As another example, a planar perspective model could be applied to a planar patch to generate vectors.

Figure 3:
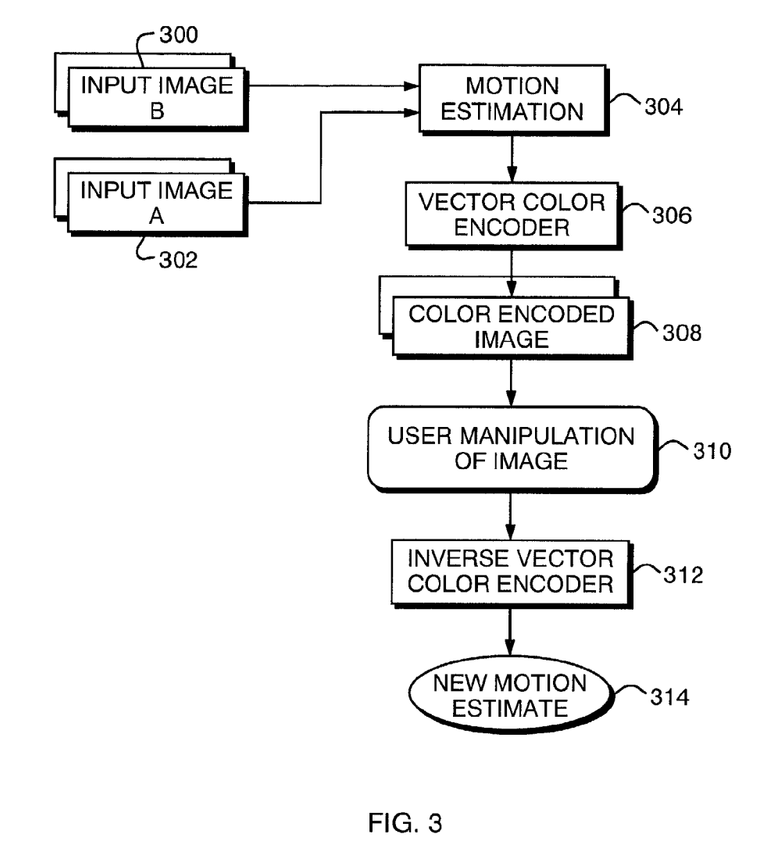
FIG. 3 is a dataflow diagram illustrating an example of encoding motion vectors into a color image for editing.

Referring to FIG. 3, and example system providing such a user interface will now be described. Two input images 300, 302 are processed using motion estimation 304 to provide a vector map (not shown). The vector map is processed by a vector color encoder 306 to provide color encoded image 308. Details of an example vector color encoder are provided below. The color encoded image 308 is displayed to the user, and the user is permitted to manipulate the image using color manipulation tools or by applying morphological operations to the image, as indicated at 310. Such color manipulation tools may include conventional paint and color correction tools, or other tools that allow a user to match different color regions, or change the chrominance. A linear operator, such as a blur filter, may be used. Morphological operators such as erode or dilate or hole fill, or a median filter, also may be used. The modified image is then processed by an inverse vector color encoder 312 to provide a changed set of motion vectors 314. Details of an example inverse vector color encoder are provided below.

In one embodiment, the vector color encoder maps the magnitude of each vector to a luma component and the direction to the chroma component. Given the motion estimate in the x and y directions for a pixel as a vector having magnitude u and direction v, the following equations may be used to compute a corresponding luma value (e.g., Y) and chroma values (e.g., U, V):

$Y = sqrt(u*u + v*v);$ $theta = -a\ tan2(v,u);$ $U = f(u,v)*cos(theta);$ and $V = f(u,v)*sin(theta).$ If saturation is constant the $f(u,v)=0.5$. If saturation is not constant, $f(u,v)$ may be, for example, defined by the following formula:

$(|v|-|v|_{min})/(|v|_{max}-|v|_{min})$ where $|v|$ is the magnitude of a vector, $|v|_{min}$ is the minimum magnitude from among the vectors, and $|v|_{max}$ is the maximum magnitude from among the vectors. With these values calculated for the motion vector for each pixel, a color image is generated.

It should be understood that the color encoder may convert the motion vectors into values into any color space, including but not limited to RGB, HSL, HSV, YUV, YIQ and CMYK.

The inverse operations may be performed to take a color image and create a vector map. Formulas describing these inverse operation are:

$theta = a\ cos(U/f(u,v));$ $u = Y*cos(theta);$ and $v = Y*sin(theta).$

In another embodiment, the color image representing the motion vectors may use the luminance of an image as its luma, with the Cr and Cb values computed in the manner described above. The image may be one of the input images, a blend of the input images, a blend of the input images warped using the motion vectors, or one of the input images warped using the motion vectors.

In any conversion of the motion vectors to a color, the range of the vectors that are converted into color also may be limited, by defining a minimum and maximum value for the vector magnitude. In this embodiment, the luma component of a pixel in the color image representing the motion vectors is the luminance of the original image. Instead of using the value 0.5 as a coefficient in the equations above, the coefficient is computed as a percentage within the range of values between the minimum and maximum values. For example, if the magnitude of the vector is outside of the range of values between the minimum and maximum values, the chroma components may be zero (indicating zero saturation), or one (indicating maximum saturation), or may be clipped to the minimum or maximum value. If the magnitude of the vector is inside the range of values between the minimum and maximum values, the coefficient is defined by the fraction of the difference between the magnitude and the minimum value over the difference between the maximum and the minimum value. A user interface may be provided to allow a user to adjust the minimum and maximum values.

Figure 4:
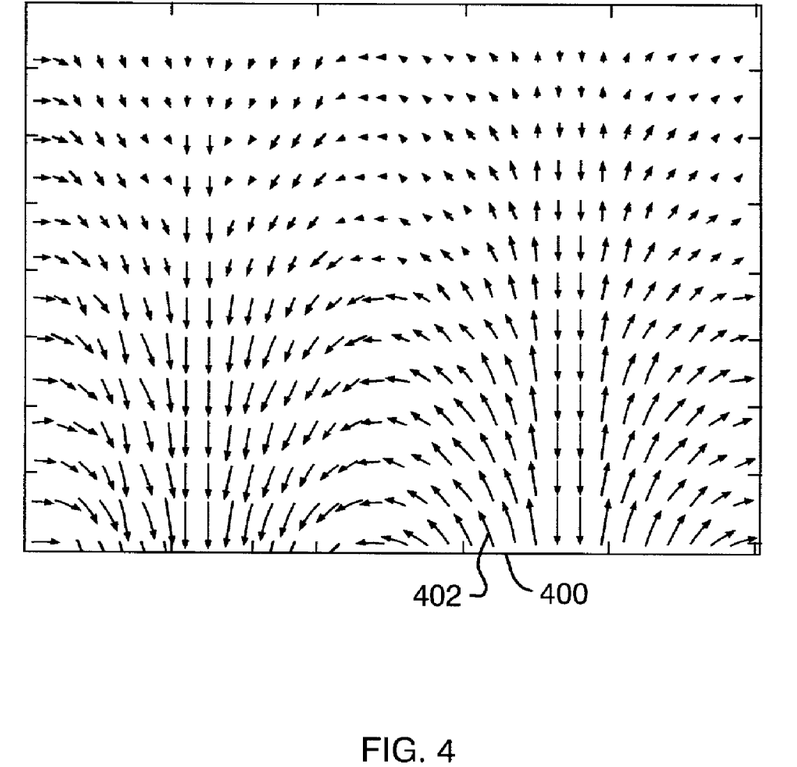
FIG. 4 is an illustration of an example legend mapping vectors to colors.

To allow a user to understand the color image and how it conveys information about the motion vectors that it represents, a color legend, such as illustrated by FIG. 4, may be used. In FIG. 4, a vector (e.g., 402) having a magnitude and direction is illustrated as an arrow, having its origin 400 at a pixel having a color representing the magnitude and direction. Several pixels in the color legend along a grid are so represented. The arrangement of the colors is generated by representing the vector magnitude on the y-axis, and the vector direction (e.g., angle) on the x-axis. The color corresponding to each point is then displayed. A legend also may be provided by a color wheel that is displayed adjacent to the color image representing the motion vectors. As a user controls a cursor control device (e.g., a mouse) to move a pointer on a screen over the color image, the vector corresponding to the pixel may be visualized in the color wheel as a point in the color space. This point to which a vector is mapped is at a radius from the center of the color wheel that corresponds to the vector magnitude and is at an angle that corresponds to the vector direction. Thus a more saturated color represents a longer vector and thus would appear to be closer to the edge of the color wheel. The direction of the vector corresponds to the color to which it is pointing, i.e., the hue angle. Thus, the orientation of the color wheel matches the orientation of the motion vectors with respect to the images being viewed. For example, if red is shown in the color wheel in the upper left, then motion up and to the left at a pixel will cause that pixel to be displayed in the color red, and the greater the magnitude of the motion, the greater the saturation. The minimum and maximum values for the saturation also may be used to control the display of a point on the legend.

Various visual effects also may be provided by the color image generated from the vector maps. For example, the color image that is created may be blended with the luminance of the original image. The color in the blended image highlights characteristics of motion may in the original image. For some image sequences, the color image created from the vector maps may be stored as a clip. This conversion of the motion information into an image may provide an interesting visual artistic effect. These effects also may be viewed by a user to provide another way of visualizing the motion information that has been estimated for the images.

Another way to correct artifacts using motion vectors involves using spatial warping and morphing techniques. Such techniques involve defining a mesh on an image, transforming the mesh, and generating an image using the transformed mesh to sample the original image. The mesh is defined by basic shapes called facets, which may be a polygon, such as a quadrilateral a triangle. The transform of the mesh may be specified manually. A mesh also may be specified by creating a mesh around points, lines and shapes. A user may specify start and destination positions of these points, lines and shapes. The transform of the mesh is derived from the specified mesh, and the specified start and destination positions of points, lines, curves and shapes that are used to define the mesh. The transform is used to warp two images (representing the start and the destination) towards each other, which are then blended together to produce an output image. Such techniques are described, for example, in *Digital Image Warping*, by George Wolberg, IEEE Computer Society Press, 1990, and "Smooth interpolation to scattered data by bivariate piecewise polynomials of odd degree," by R. H. J. Gmelig Meyling et al., Computer Aided Geometric Design, Vol. 7, pages 439–458, 1990, and "Piecewise Cubic Mapping Functions for Image Registration," by A. Goshtasby, Pattern Recognition, Vol. 20, No. 5, pp. 525–533, 1987, and "A method of bivariate interpolation and smooth surface fitting for irregularly distributed data points," by H. Akima, ACM Transactions on Mathematical Software, Vol. 4, No. 2, June 1978, pp. 148–159, and "A triangle-based $C^1$ interpolation method," by R. J. Renka et al., Rocky Mountain Journal of Mathematics, Vol. 14, No. 1, 1984, pp. 223–237, and "Approximation and geometric modeling with simplex B-splines associated with irregular triangles," by S. Auerbach et al., Computer Aided Geometric Design, Vol. 8, pp. 67–87, 1991, and "A piecewise linear mapping function for image registration," by A. Goshtasby, Pattern Recognition, Vol. 19, pp. 459–466, 1986.

The transforms that are derived for mesh warping and morphing can be used to generate a set of motion vectors that describe the transform. For example, referring now to FIG. 5, during a warp operation, a point in time along the path between the start and destination positions is specified for each vertex of each facet of the mesh. This specified point in time corresponds to the point in time at which the motion vectors are centered using motion estimation.

Figure 5:
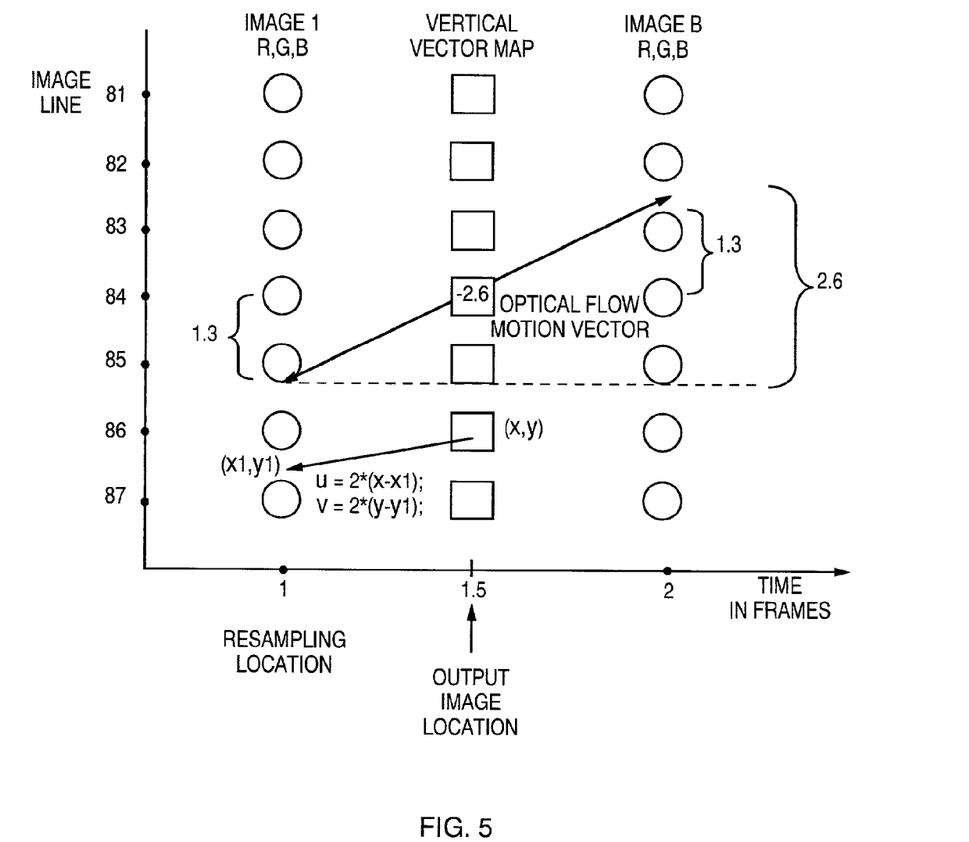
FIG. 5 illustrates how motion vectors may be computed from a spatial transform.

Typically the motion vectors are centered on one of the images or may be centered at the midpoint or other location between the images. For example, as described in U.S. patent application Ser. No. 09/657,699 filed Sep. 8, 2000, and hereby incorporated by reference, this point may be the midpoint between the two images, as indicated in FIG. 5. See also U.S. patent application entitled "Analyzing Motion of Characteristics in Images," by Katherine Cornog and Randy Fayan, filed on even date herewith and U.S. patent application entitled "Interpolation of a Sequence of Images Using Motion Analysis," by Katherine Cornog et al., filed on even date herewith, both of which are hereby incorporated by reference.

In the following example, the motion vectors are centered at the midpoint between two images. Using the transform specified by the mesh for the warping operation, given a point (x,y) in the output image, a location (x1, y1) in the source image that is resampled to generate that image is determined. The motion vector (u,v) for point (x,y) is computed as twice the difference between the pixel location (x,y) and the pixel location (x1,y1). In particular, $u=2*(x-x1)$ and $v=2*(y-y1)$. The difference in locations is doubled because the motion vectors represent motion between the two images and they are centered at the midpoint between these images. Thus, as indicated in FIG. 5, if the vertical distance between a pixel location in the vector map and a pixel location in the source image is 1.3, then the distance between the pixel location in the destination image and the pixel location in the source image is 2.6. The sign of the vector depends on the orientation of the image space, which in this case is the upper left corner of the image. Hence the vertical vector map includes the value −2.6 for the example pixel.

Using this technique, any user specified spatial transform may be used to generate vectors that correspond to the vector map generated using motion estimation.

Figure 6:
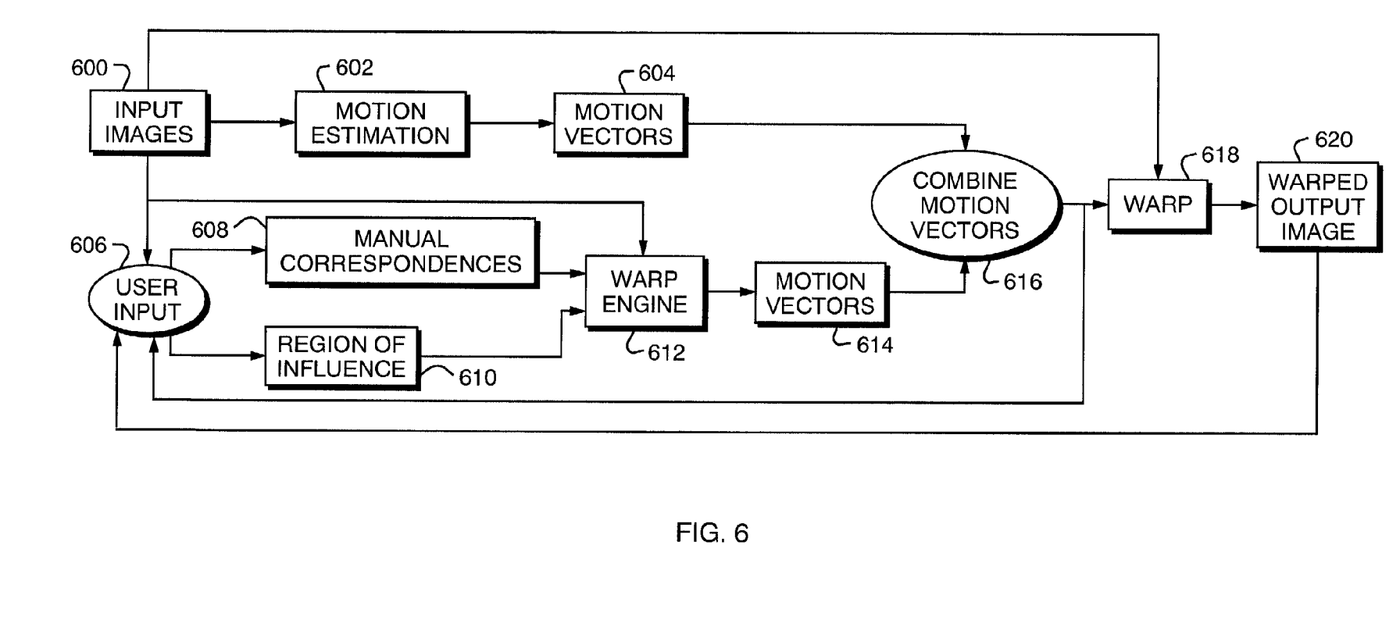
FIG. 6 is a dataflow diagram illustrating and example system that combines vectors of user-specified transforms with motion vectors.

Referring now to FIG. 6, the vectors generated for a user specified transform and those generated from motion estimation may be combined and used for various image processing applications that use motion vectors, such as warping. As shown in FIG. 6, the input images 600 are processed by motion estimation 602 to produce a set of motion vectors 604. The input images 600 also are provided to a user interface 606 through which a user may specify points, lines, curves and/or regions in one of the images, and corresponding points, lines or shapes in the other of the images, indicated as correspondences 608. A user also may specify a bounding box, or region of influence 610. If this region does not move between the two images, this region limits the extent of any operations on the input images by the warp engine 612. The warp engine 612 implements a conventional warping operation, with the modification noted above that causes it to output vectors 614 for each pixel in a grid at a point in time that corresponds to the point in time used to specify the motion vectors 604. The motion vectors 604 and 614 are combined at 616 to produce a changed set of vectors. The combination may be a blend of both sets of vectors, or a replacement of some of the motion vectors 604 by motion vectors 514, for example, within a specified region, e.g., the region of influence. The sets of vectors may be combined using an alpha matte, which may be specified by the user, derived from the region of influence or specified in any other way. The changed motion vectors then may be used for further image processing, for example a warp operation 618. The result 620 of such processing also may be provided to the user interface 606 to allow a user to interactively modify the correspondences 608 and region of influence 610 based on the results. The combined motion vectors, or motion vectors 604 and 614, also may be displayed to the user through user interface 606.

Figure 7:
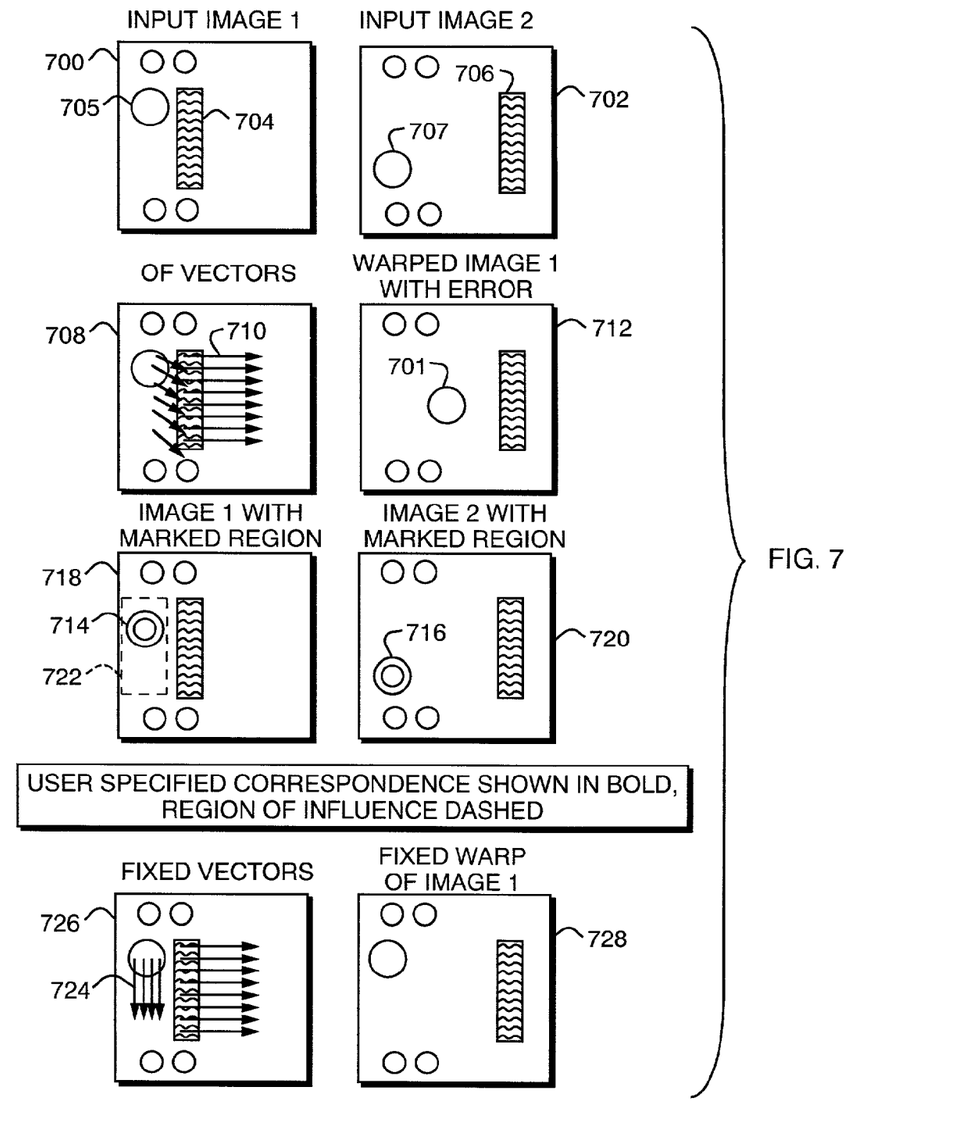
FIG. 7 illustrates example images processed using a system such as shown in FIG. 6.

An illustration of such correction will now be described in connection with FIG. 7. Images 700 and 702 are the original input images. Rectangle 704 moves to the right from a position in the first image to a new position in the second image, as indicated at 706. Circle 705 moves down from a position in the first image to a new position in the second image, as indicated at 707. Image 708 illustrates nonzero motion vectors 710 that are computed based on the two images 700 and 702. It should be understood that these images are provided for the purpose of illustration only and do not represent actual examples. A result of applying the motion vectors 710 to warp the original image, the image 712 is obtained. However, the circle 705 is moved incorrectly to the position at 711. Using the technique shown in FIG. 6, a user specifies objects 714 and 716 in images 718 and 720 as corresponding, and the user defines a region of influence 722. Because object 714 moves down to object 716 within the region of influence 722, new motion vectors are created based on a transform between objects 714 and 716. When these vectors are combined with the originally estimated motion vectors 710, the result is shown at 724 in image 726 as the changed vectors. When these changed vectors are applied to the input image to warp the image to generate the output image, correct motion is obtained, as indicated by image 728.

Figure 8:
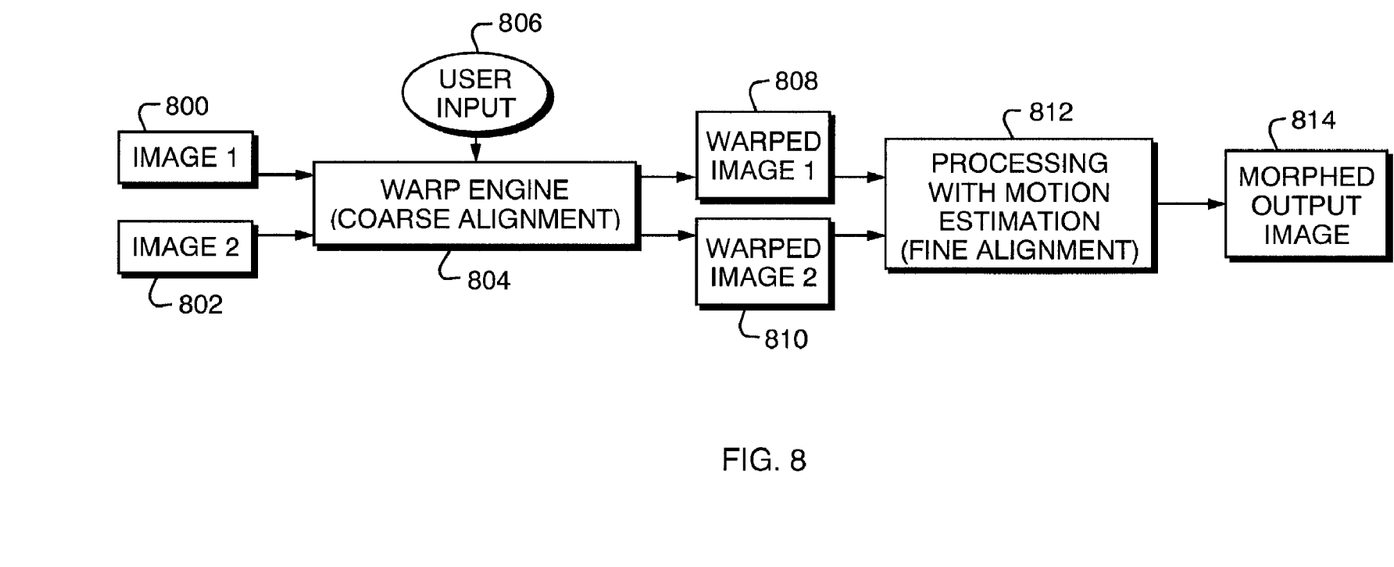
FIG. 8 is a dataflow diagram illustrating the use of user-specified transform for preprocessing images.

An alternative approach that also uses user-specified transforms involves coarsely aligning objects using a user-specified transform to warp the input images, using conventional warping techniques. Motion estimation is then applied to the warped images. The warped images then may be processed using the estimated motion to perform a fine alignment of the objects. Motion between the images that are generated by such a warp operation can then be estimated, and used to more finely align the two objects. This process is illustrated in FIG. 8. Input images 800 and 802 are input to a conventional warp engine 804. A user interface is used to obtain user input 806 that specifies the warp operation to be performed. The warp operation so performed generates warped output images 808 and 810. Processing with motion estimation is then performed as indicated at 812. In particular, motion estimation is performed on the images 808 and 810, to produce motion vectors that are used to warp and blend the images 808 and 810 to produce the final morphed output image 814.

Having now described a few embodiments, it should be apparent to those skilled in the art that the foregoing is merely illustrative and not limiting, having been presented by way of example only. Numerous modifications and other embodiments are within in the scope of one of ordinary skill in the art and are contemplated as falling within with scope of the invention.

What is claimed is:

1. A method for generating motion vectors, comprising:
determining a set of motion vectors that describes motion between a first image and a second image using motion estimation, wherein the set of motion vectors includes a vector for each pixel describing motion of the pixel from the first image to the second image; and
changing the set of motion vectors by:
selecting one or more portions of at least one of the first image and the second image; and
modifying motion vectors in the set of motion vectors corresponding to the selected one or more portions.

2. The method of claim 1, further comprising performing image processing using the changed set of motion vectors.

3. The method of claim 1, wherein selecting one or more portions of at least one of the first image and the second image comprises:
identifying a foreground region and a background region in the first image and the second image and selecting one of the foreground region and the background region as a tracked region;
and wherein modifying motion vectors in the set of motion vectors comprises:
performing tracking on tracked region to determine a motion model for the tracked region; and
changing the set of motion vectors corresponding to the tracked region according to the motion model for the tracked region.

4. The method of claim 1,
wherein selecting one or more portions of at least one of the first image and the second image comprises identifying a region in one of the first image and the second image; and
wherein modifying the set of motion vectors comprises defining a combination map that indicates, for motion vectors in the identified region, whether pixels in a background image only, a foreground image only, or both the background image and the foreground image, from the identified region are used to generate an output image using the motion vectors.

5. A method for generating motion vectors, comprising:
determining a set of motion vectors that describes motion between a first image and a second image using motion estimation; and
changing the set of motion vectors by:
receiving an indication of a user specified transform between the first image and the second image;
computing vectors using the user specified transform and corresponding in time and in resolution with the determined set of motion vectors; and
combining the computed vectors with the set of motion vectors.

6. The method of claim 5, wherein the user specified transform is defined by at least one point in the first image and at least one corresponding point in the second image, and wherein computing vectors comprises determining a spatial transform for warping the first image to the second image that maintains correspondence between the at least one point in the first image and the at least one point in the second image.

7. The method of claim 6, wherein the user specified transform is defined by at least one line in the first image and at least one corresponding line in the second image.

8. The method of claim 6, wherein the user specified transform is defined by at least one region in the first image and at least one corresponding region in the second image.

9. The method of claim 1, wherein changing the set of motion vectors comprises:
displaying to a user a color image, wherein each pixel in the color image is defined by a motion vector corresponding to the pixel in the set of motion vectors;
allowing the user to modify the color image; and
changing the set of motion vectors according to the modified color image.

10. An apparatus for generating motion vectors, comprising:
means for determining a set of motion vectors that describes motion between a first image and a second image, using motion estimation, wherein the set of motion vectors includes a vector for each pixel describing motion of the pixel from the first image to the second image; and
means for changing the set of motion vectors by selecting one or more portions of at least one of the first image and the second image and modifying motion vectors in the set of motion vectors corresponding to the selected one or more portions.

11. The apparatus of claim 10, further comprising means for performing image processing using the changed set of motion vectors.

12. The apparatus of claim 10, wherein the means for changing the set of motion vectors selects the one or more portions by identifying a foreground region and a background region in the first image and the second image, and selected one of the foreground region and the background region as a tracked region; and
wherein the means for changing the set of motion vectors modifies the motion vectors by performing tracking on the tracked region to determine a motion model for the tracked region and changing the set of motion vectors corresponding to the tracked region according to the motion model for the tracked region.

13. The apparatus of claim 10, wherein the means for changing the set of motion vectors selects the one or more portions by identifying a foreground region and a background region in one of the first image and the second image; and
wherein the means for changing modifies the set of motion vectors by defining a combination map that indicates, for motion vectors in the identified region, whether pixels in a background image only, a foreground image only, or both the background image and the foreground image, from the identified region are used to generate an output image using the motion vectors.

14. An apparatus for generating motion vectors, comprising:
means for determining a set of motion vectors that describes motion between a first image and a second image using motion estimation;
means for changing the set of motion vectors, comprising:
means for receiving an indication of a user specified transform between the first image and the second image;
means for computing vectors using the user specified transform and corresponding in time and in resolution with the determined set of motion vectors; and
means for combining the computed vectors with the set of motion vectors.

15. The apparatus of claim 10, wherein the user specified transform is defined by at least one point in the first image and a at least one corresponding point in the second image, and wherein the means for computing vectors comprises means for determining a spatial transform for warping the first image to the second image that maintains correspondence between the at least one point in the first image and the at least one point in the second image.

16. The apparatus of claim 15, wherein the user specified transform is defined by at least one line in the first image and at least one corresponding line in the second image.

17. The apparatus of claim 15, wherein the user specified transform is defined by at least one region in the first image and at least one corresponding region in the second image.

18. The apparatus of claim 10, wherein the means for changing the set of motion vectors comprises:
means for displaying to a user a color image, wherein each pixel in the color image is defined by a motion vector corresponding to the pixel in the set of motion vectors;
means for allowing the user to modify the color image; and
means for modifying the set of motion vectors according to the modified color image.

19. A computer program product, comprising:
a computer readable medium;
computer program instructions stored on the computer readable medium that, when processed by the computer, instruct the computer to perform a method for generating motion vectors, comprising:
determining a set of motion vectors that describes motion between a first image and a second image using motion estimation, wherein the set of motion vectors includes a vector for each pixel describing motion of the pixel from the first image to the second image; and
changing the set of motion vectors by:
selecting one or more portions of at least one of the first image and the second image; and
modifying motion vectors in the set of motion vectors corresponding to the selected one or more portions.

20. The computer program product of claim 19, wherein the method further comprises performing image processing using the changed set of motion vectors.

21. The computer program product of claim 19, wherein selecting one or more portions of at least one of the first image and the second image comprises:
identifying a foreground region and a background region in the first image and the second image and selecting one of the foreground region and the background region as a tracked region;
and wherein modifying motion vectors in the set of motion vectors comprises:
performing tracking on the tracked region to determine a motion model for the tracked region; and
changing the set of motion vectors corresponding to the tracked region according to the motion model for the tracked region.

22. The computer program product of claim 19,
wherein selecting one or more portions of at least one of the first image and the second image comprises identifying a region in one of the first image and the second image; and
wherein modifying the set of motion vectors comprises defining a combination map that indicates, for motion vectors in the identified region, whether pixels in a background image only, a foreground image only, or both the background image and the foreground image, from the identified region are used to generate an output image using the motion vectors.

23. A computer program product, comprising:
a computer readable medium;
computer program instructions stored on the computer readable medium that, when processed by the computer, instruct the computer to perform a method for generating motion vectors, comprising:
determining a set of motion vectors that describes motion between a first image and a second image using motion estimation; and
changing the set of motion vectors by:
receiving an indication of a user specified transform between the first image and the second image;
computing vectors using the user specified transform and corresponding in time and in resolution with the determined set of motion vectors; and
combining the computed vectors with the set of motion vectors.

24. The computer program product of claim 23, wherein the user specified transform is defined by at least one point in a the first image and at least one corresponding point in the second image, and wherein computing vectors includes determining a spatial transform for warping the first image to the second image that maintains correspondence between the at least one point in the first image and the at least one point in the second image.

25. The computer program product of claim 24, wherein the user specified transform is defined by at least one line in the first image and at least one corresponding line in the second image.

26. The computer program product of claim 24, wherein the user specified transform is defined by at least one region in the first image and at least one corresponding region in the second image.

27. The computer program product of claim 19, wherein changing the set of motion vectors comprises:
displaying to a user a color image, wherein each pixel in the color image is defined by a motion vector corresponding to the pixel in the set of motion vectors;
allowing the user to modify the color image; and
changing the set of motion vectors according to the modified color image.

28. The computer program product of claim 24, wherein the set of motion vectors includes a vector for each pixel describing motion of the pixel from the first image to the second image and wherein computing vectors comprises determining, for each pixel in the first image, a set of transform vectors that describe the spatial transform of the pixel in the first image to a corresponding pixel in the second image.

29. The method of claim 6, wherein the set of motion vectors includes a vector for each pixel describing motion of the pixel from the first image to the second image, and wherein computing vectors comprises determining, for each pixel in the first image, a set of transform vectors that describe the spatial transform of the pixel in the first image to a corresponding pixel in the second image.

30. The apparatus of claim 15, wherein the set of motion vectors includes a vector for each pixel describing motion of the pixel from the first image to the second image and wherein the means for computing vectors comprises means for determining, for each pixel in the first image, a set of transform vectors that describe the spatial transform of the pixel in the first image to a corresponding pixel in the second image.

* * * * *